(12) United States Patent  (10) Patent No.: US 9,050,854 B2
Maroon et al.  (45) Date of Patent: Jun. 9, 2015

(54) FLEXIBLE COVER FOR AN AXLE HUB JOINT

(75) Inventors: Patrick J. Maroon, Palatine, IL (US); Eric R. O'Brien, Yorkville, IL (US)

(73) Assignee: Caterpillar Inc., Peoria, IL (US)

( * ) Notice: Subject to any disclaimer, the term of this patent is extended or adjusted under 35 U.S.C. 154(b) by 615 days.

(21) Appl. No.: 13/363,470

(22) Filed: Feb. 1, 2012

(65) Prior Publication Data

US 2013/0193746 A1 Aug. 1, 2013

(51) Int. Cl.
B60B 27/00 (2006.01)

(52) U.S. Cl.
CPC .................................. B60B 27/0073 (2013.01)

(58) Field of Classification Search
CPC ...... B60B 27/0073; B60B 3/085; B60B 7/061
USPC .......................................... 305/100, 107, 115
See application file for complete search history.

(56) References Cited

U.S. PATENT DOCUMENTS

| 4,205,539 A * | 6/1980 | Orain ............................ 464/111 |
| 4,210,002 A | 7/1980 | Dore |
| 4,360,209 A | 11/1982 | Ukai |
| 4,558,869 A | 12/1985 | Grove |
| 4,908,005 A * | 3/1990 | Van Dest et al. ............... 464/111 |
| 5,176,390 A | 1/1993 | Lallement |
| 5,431,601 A | 7/1995 | Nakamura |
| 7,556,323 B1 * | 7/2009 | Gachhadar et al. ........... 305/107 |
| 8,066,337 B2 * | 11/2011 | Tsuzaki et al. ............. 301/105.1 |
| 2008/0042388 A1 | 2/2008 | McDowell |

FOREIGN PATENT DOCUMENTS

| CA | 2083580 | 5/1994 |
| GB | 725881 | 3/1955 |
| GB | 1452991 | 10/1976 |
| WO | 0208625 | 1/2002 |

* cited by examiner

*Primary Examiner* — S. Joseph Morano
*Assistant Examiner* — Jean Charleston
(74) *Attorney, Agent, or Firm* — Finnegan, Henderson, Farabow, Garrett & Dunner, LLP

(57) ABSTRACT

A flexible cover for an axle hub joint is provided. The flexible cover comprises a tubular member having a first end and a second end. The tubular member is configured to cover the axle hub joint. A first flange is defined at the first end of the tubular member and is rigidly attached to a wheel hub. A portion of the second end of the tubular member is configured to rotatably connect to a bearing groove and is free to rotate within the bearing groove.

17 Claims, 5 Drawing Sheets

FLEXIBLE COVER FOR AN AXLE HUB JOINT

TECHNICAL FIELD

The present disclosure relates to flexible covers for articulated or rotatable joints, and more particularly to a flexible cover for an axle hub joint.

BACKGROUND

Landfill compactors are generally used to compact debris and soil on the ground. In operation, a landfill compactor needs to be protected at its flexible or articulated joints since these joints are directly exposed to the soil or debris in harsh working environments. A large number of metallic and non metallic protective guards used to address this issue generally lack a factor of flexibility due to which they cannot be connected to relatively moving parts abutting the articulated joints. Further, the metallic protective guards' may leave a gap between the relatively moving parts of the joint thus allowing some soil or debris to enter the joint. Furthermore, the metallic protective guards are prone to corrosion problems.

Hence, flexible covers are provided in machines to flexibly cover and protect articulated or rotatable joints present in the machine. For example, U.S. Pat. No. 4,558,869 relates to a boot for enclosing a flexible rotating joint. The boot body has a generally tubular shape with end openings and at least one longitudinal seam running from one end opening to the other. The seam is formed by two edges. One edge mates with the other edge to form a boot with an annular cross-section. The edges of the seam are bonded to one another by a thin, flexible bond extending along the contact surface between them. Furthermore, adapter rings are placed within the end openings.

SUMMARY OF THE DISCLOSURE

In one aspect, the present disclosure provides a flexible cover for an axle hub joint. The flexible cover comprises a tubular member having a first end and a second end. The tubular member is configured to cover the axle hub joint. A first flange defined at the first end of the tubular member is rigidly attached to a wheel hub. A portion of the second end of the tubular member is configured to rotatably connect to a bearing groove and is free to rotate within the bearing groove.

In another aspect, the present disclosure discloses an axle hub assembly for a machine. The axle hub assembly comprises an axle, the wheel hub, and the flexible cover. The wheel hub is rotatably connected to the axle by the axle hub joint. The flexible cover includes the tubular member configured to cover the axle hub joint. The flexible cover has the first end and the second end. The first flange defined at the first end of the tubular member is rigidly attached to the wheel hub. The portion of the second end of the tubular member is configured to rotatably connect to the bearing groove and is free to rotate within the bearing groove.

In another aspect, the present disclosure discloses the machine including an engine, a differential, and the axle hub assembly. The differential is rotatably connected to the engine. The axle hub assembly encases the differential and includes the axle, the wheel hub, and the flexible cover. The flexible cover includes the tubular member configured to cover the axle hub joint. The flexible cover has the first end and the second end. The first flange defined at the first end of the tubular member is rigidly attached to the wheel hub. The portion of the second end of the tubular member is configured to rotatably connect to the bearing groove and is free to rotate within the bearing groove.

Other features and aspects of this disclosure will be apparent from the following description and the accompanying drawings.

DETAILED DESCRIPTION

Figure 1:
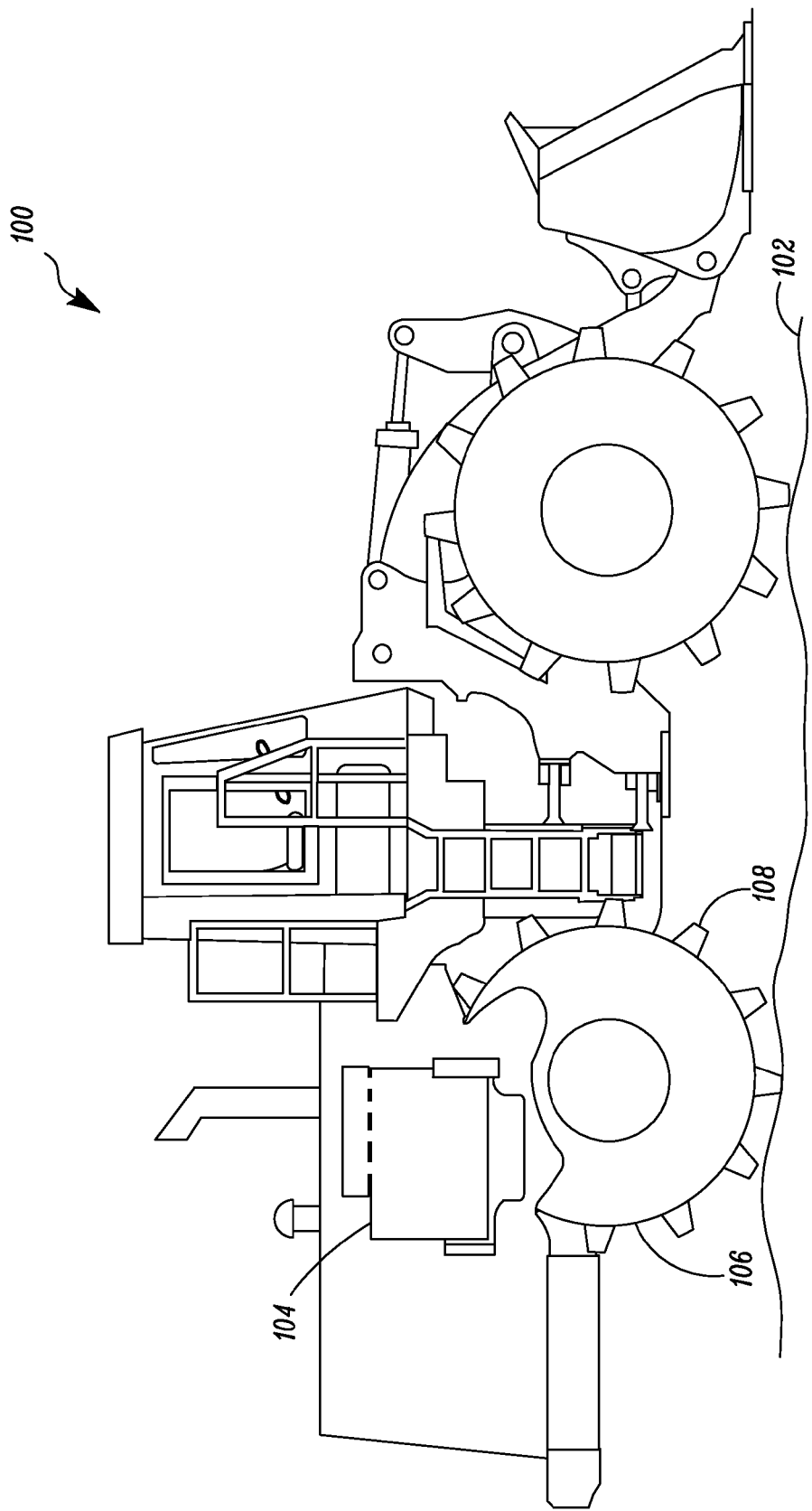
FIG. 1 is a side view of an exemplary machine.
Figure 2:
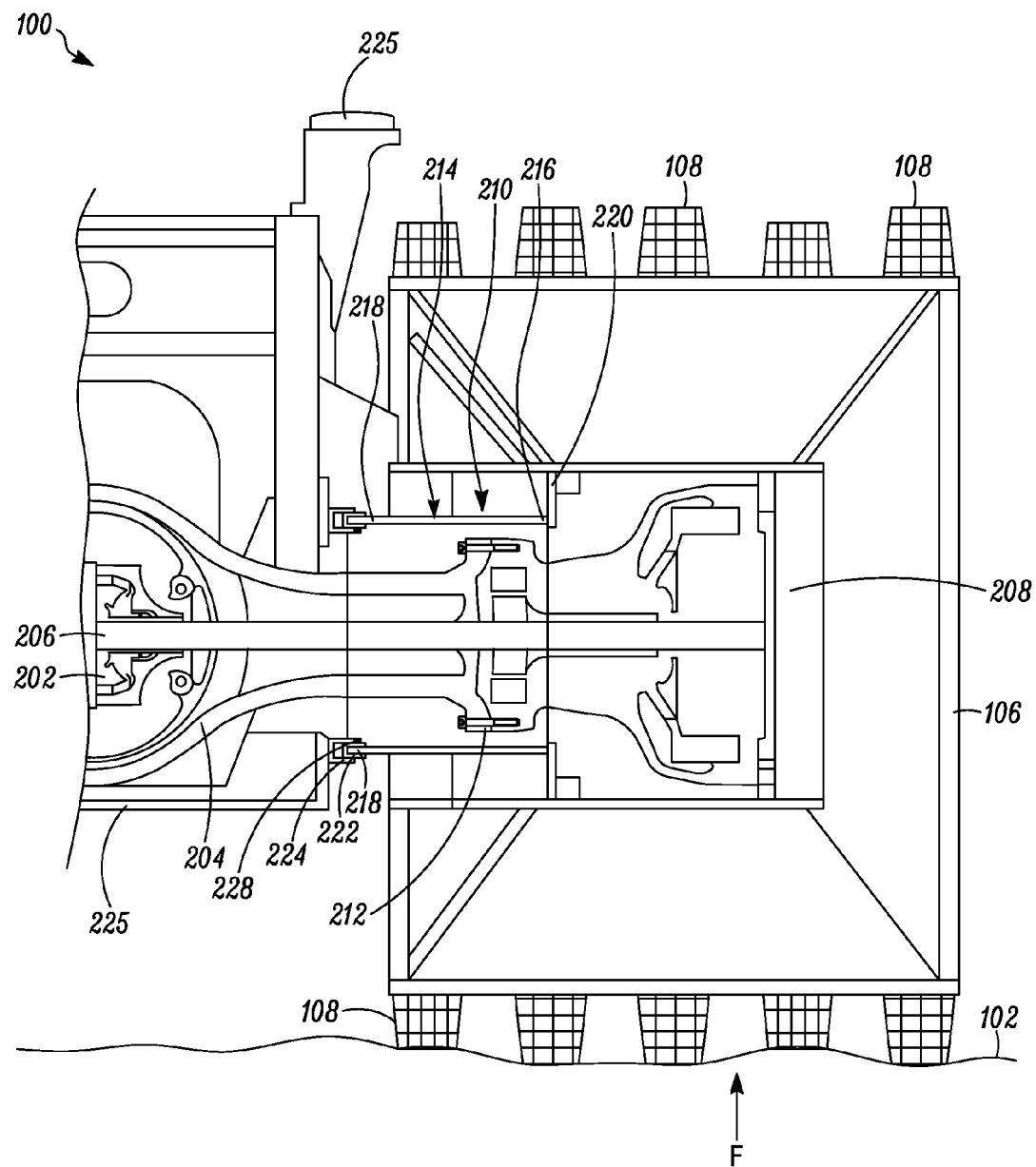
FIG. 2 is a sectional view of a rear end of the exemplary machine.

The present disclosure relates to a flexible cover for articulated or rotatable joints in a machine 100. FIG. 1 shows a side view of an exemplary machine 100. The machine 100 may be a wheeled industrial vehicle, for example, but not limited to, landfill compactors, loaders, material handlers, trucks, wheeled dozers, and the like. In an embodiment, as shown in FIGS. 1 and 2, the machine 100 may embody a landfill compactor which may be used for compacting debris or soil on the ground 102. The machine 100 includes an engine 104. The engine 104 may be a conventional engine that delivers power to the machine 100 by combusting a fuel such as gasoline. The engine 104 powers a wheel rim 106 together with compactor teeth 108 to compact any debris or soil on the ground 102.

The machine 100 further includes a differential 202 and an axle hub assembly 204 as shown in FIG. 2. The differential 202 is rotatably connected to the engine 104. The axle hub assembly 204 encases the differential 202 and includes an axle 206, a wheel hub 208, and a flexible cover 210. The wheel hub 208 is rotatably connected to the axle 206 by an axle hub joint 212. The flexible cover 210 includes a tubular member 214 having a first end 216 and a second end 218. The tubular member 214 is configured to cover the axle hub joint 212.

As described above, the tubular member 214 has the first end 216 and the second end 218. A first flange 220 is defined at the first end 216 of the tubular member 214. The first flange 220 is rigidly attached to the wheel hub 208. The first flange 220 may be adhered or snap fit into the wheel hub 208 to accomplish a rigid attachment with the wheel hub 208. A person of ordinary skill in the art will appreciate that the rigid attachment of the first flange 220 to the wheel hub 208 described above is merely on an exemplary basis and does not limit the scope of this disclosure and any known method may be used to rigidly attach the first flange 220 to the wheel hub 208.

Similarly, a portion 222 of the second end 218 of the tubular member 214 is configured to rotatably connect to a bearing groove 224 and is free to rotate within the bearing groove 224. As illustrated, the bearing groove 224 is configured to substantially concentrically receive the portion 222 of the second end 218.

Figure 3:
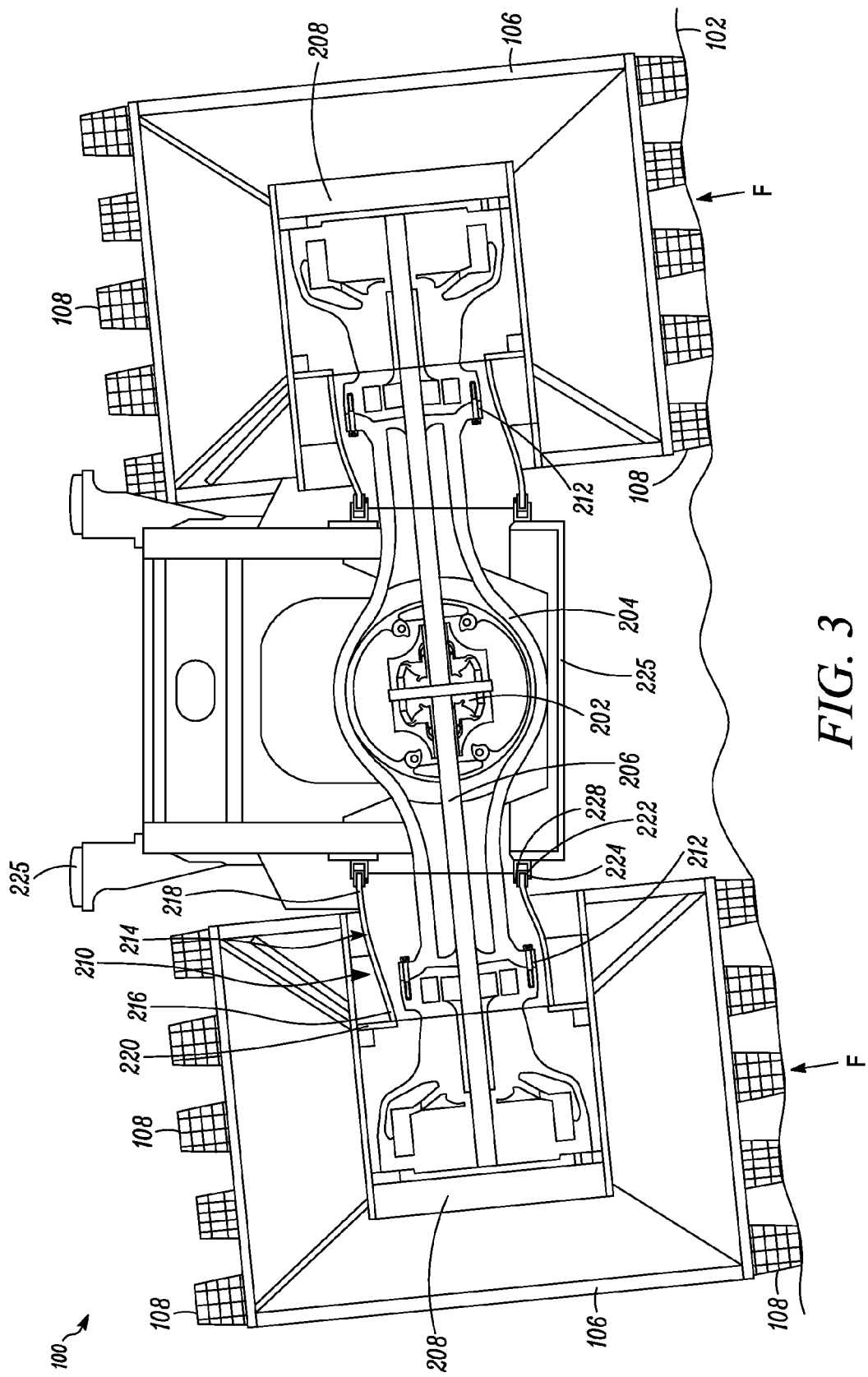
FIG. 3 is a sectional view of a rear end of an exemplary machine having a flexible cover for an axle hub joint while the machine is in operation.

FIG. 3 shows a sectional view of the rear end of the exemplary machine 100 having the flexible cover 210 for the axle hub joint 212 while the machine 100 is compacting debris on the ground 102. The wheel hub 208 of the machine 100 is rigidly encircled by the wheel rim 106 and the compactor teeth 108. Hence, the wheel rim 106 together with the compactor teeth 108 are rotated by the axle 206 via the wheel hub 208 to compact any debris or soil on the ground 102. During the compacting process, the wheel hub 208 of the machine 100 is subjected to reaction forces F from the ground 102 due to a weight of the machine 100. The reaction forces F may also result from unevenness of the ground 102 in addition to the weight of the machine 100.

In an embodiment, the machine 100 further includes a chassis 225 on which the engine 104 is rigidly mounted. Further, during operation, the compactor teeth 108 may also pick up debris or soil from the ground 102. Some of the picked up debris or soil may fall, between the chassis 225 and the wheel rim 106 onto the flexible cover 210, while the wheel rim 106 is rotating. Furthermore, as a result of the reaction forces F on the wheel hub 208, the wheel hub 208 and the axle 206 may move relative to the chassis 225, for example, a ±6° oscillation of the wheel hub 208 and axle 206 with respect to the chassis 225. Therefore, the axle hub joint 212 rotatably connecting the wheel hub 208 to the axle 206 is exposed to the debris or soil. A person of ordinary skill in the art will acknowledge that the axle hub joint 212 is a dry or wet type lubricated joint such as a ball and socket joint or a hinge joint. Any entry of debris or soil into the axle hub joint 212 hinders the smooth functioning of the axle hub joint 212. Hence, the axle hub joint 212 needs to be covered at all times during operation to prevent entry of debris or soil. The tubular member 214 of the flexible cover 210 is shown bent in FIG. 3 to illustrate a flexibility of the flexible cover 210 when the machine 100 is in operation and reaction forces F act on either wheel hub 208 of the machine 100. Hence, the tubular member 214 serves to flexibly cover the axle hub joint 212. In the embodiments as shown in FIGS. 2 and 3, the first flange 220 is shown to be flared perpendicularly outward to the tubular member 214 and the portion 222 of the second end 218 is shown to be coaxially disposed to the tubular member 214. Subsequently, the bearing groove 224 is disposed in a lateral orientation to rotatably connect to the portion 222 of the second end 218.

Figure 4:
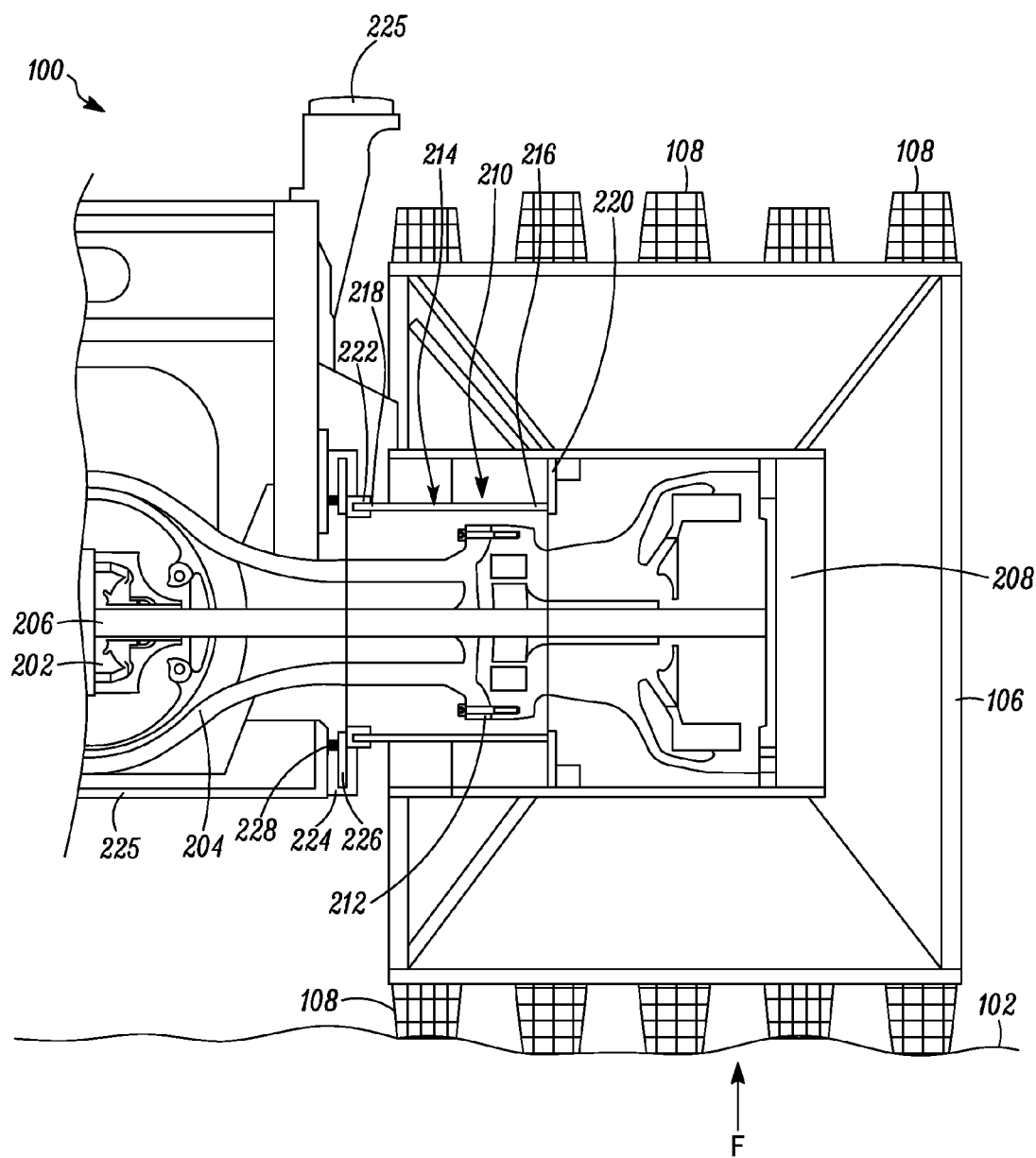
FIG. 4 is a sectional view of the flexible cover for an axle hub joint.

However, in another embodiment as shown in FIG. 4, a second flange 226 is rigidly attached to the portion 222 of the second end 218 of the tubular member 214. In this embodiment, the bearing groove 224 is disposed in a vertical orientation to rotatably connect to the second flange 226 of the tubular member 214. Furthermore, the bearing groove 224 is configured to substantially concentrically receive the second flange 226. A person of ordinary skill in the art will appreciate that the first flange 220 and the second flange 226 may be of a flared or semi-flared type. The extent of flaring selected for the first and second flange 220, 226 may depend on various factors of the machine 100 and the conditions under which the tubular member 214 is subjected to. The configuration of the first and second flange 220, 226 described above is merely on an exemplary basis and does not limit the scope of this disclosure. Any similar configuration of the first and second flange 220, 226 may be used to rigidly attach the first flange 220 to the wheel hub 208 and rotatably connect the second flange 226 to the bearing groove 224. Consequently, the bearing groove 224 may be disposed in any orientation to rotatably connect to the second flange 226 so that the second flange 226 is free to rotate within the bearing groove 224. In an embodiment, the bearing groove 224 is made of ultra high molecular weight polyethylene compound or steel.

In the preceding embodiments, the tubular member 214 is made of an elastomeric material such as rubber. A person of ordinary skill in the art will appreciate that the tubular member 214 made of rubber described above is merely on an exemplary basis and does not limit the scope of this disclosure. Any material possessing elasticity may be used to manufacture the tubular member 214.

Furthermore, in the embodiments as shown in FIGS. 2-4, the flexible cover 210 includes a seal 228 abutting the portion 222 of the second end 218. The seal 228 defines a leak proof flexible cover 210 for the axle hub joint 212.

Figure 5:
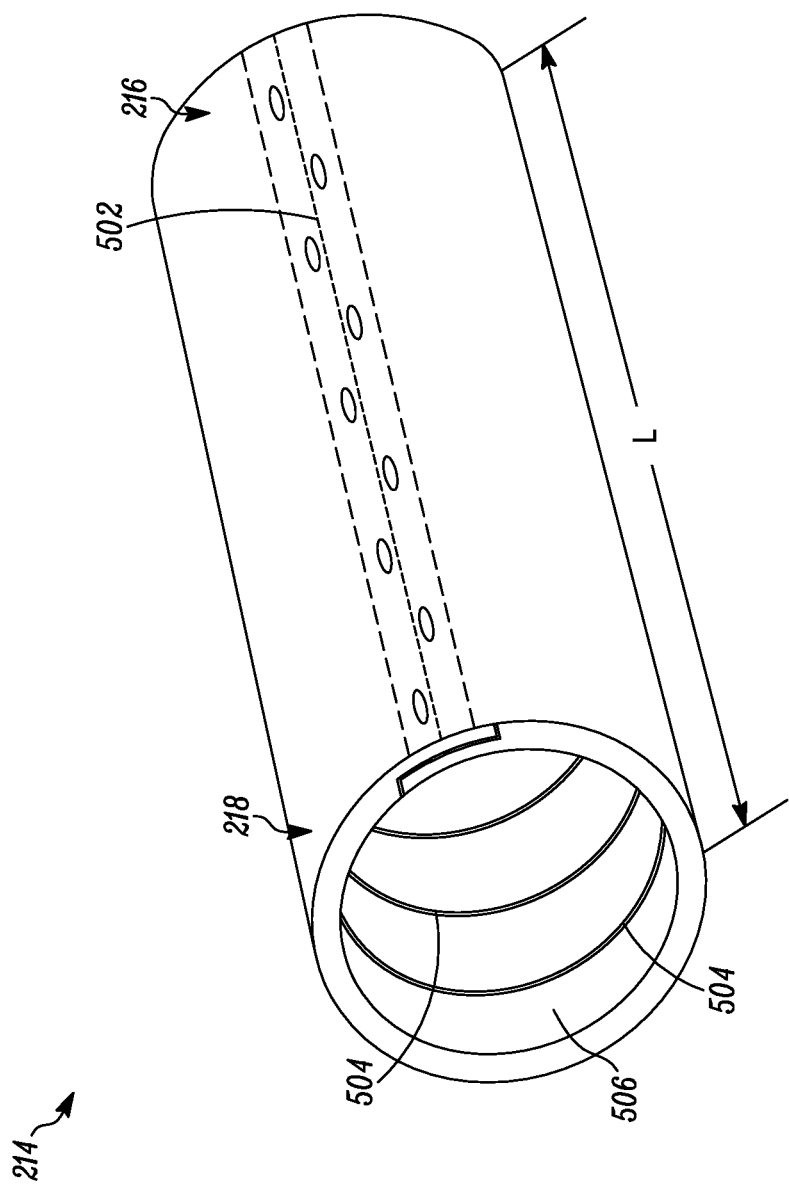
FIG. 5 is a perspective view of a tubular member.

In an embodiment as shown in FIG. 5, the flexible cover 210 further includes one or more longitudinal seams 502 running from the first end 216 of the tubular member 214 to the second end 218 of the tubular member 214. The flexible cover 210 may further include one or more annular support rings 504 rigidly attached to an inner wall 506 of the tubular member 214. The annular support rings 504 are intermittently spaced along a length L of the tubular member 214 to provide support to the tubular member 214 while maintaining a controlled degree of flexibility in the tubular member 214.

INDUSTRIAL APPLICABILITY

Landfill compactors are generally used to compact debris and soil on the ground 102. In operation, a landfill compactor needs to be protected at its flexible or articulated joints since these joints are directly exposed to the soil or debris in harsh working environments. A large number of metallic and non metallic protective guards used to address this issue generally lack a factor of flexibility due to which they cannot be connected to relatively moving parts abutting the articulated joints. Further, the metallic protective guards' may leave a gap between the relatively moving parts of the joint thus still allowing some soil or debris to enter the joint. Furthermore, the metallic protective guards are prone to corrosion problems.

The flexible cover 210 comprising the tubular member 214 is used to cover the axle hub joint 212. Generally, the axle hub joint 212 rotatably connects the wheel hub 208 to the axle 206. The wheel hub 208 is subjected to reaction forces F when the machine 100 is in operation and used for compaction of debris or soil on the ground 102. The tubular member 214 flexibly covers the axle hub joint 212 while allowing the wheel hub 208 to move relative to the axle 206. Further, the tubular member 214 flexibly covers the axle hub joint 212 while allowing the wheel hub 208 and the axle 206 to move relative to the chassis 225. The tubular member 214 prevents entry of debris, or soil from the ground 102 into the axle hub joint 212.

The flexible cover 210 assists an operator of the machine 100 in operating the machine 100 smoothly while maintaining cleanliness and lubrication in the axle hub joint 212. Subsequently, the flexible cover 210 lowers maintenance costs of the axle hub joint 212 during its service period. At a time, when maintenance of the axle hub joint 212 is required, the flexible cover 210 is easily collapsible and removable. Hence, the flexible cover 210 provides the operator, easy access to the axle hub joint 212 for cleaning and greasing purposes.

Furthermore, the tubular member 214 being made of an elastomeric material provides for flexibility in the tubular member 214 while the tubular member 214 undergoes bending forces as a result of relative movement between the axle 206 and the chassis 225. Hence, the tubular member 214 allows an uninhibited relative movement between the axle 206, the wheel hub 208 and the chassis 225

In the embodiments described above, the flexible cover 210 includes a seal 228 abutting the portion 222 of the second end 218. The seal 228 defines a leak proof flexible cover 210 for the axle hub joint 212. The seal 228 develops a back pressure to ensure that grease or any suitable lubricant present in the bearing groove 224 does not come in contact with the debris or soil from the ground 102. The back pressure of the seal 228 ensures that the portion 222 of the second end 218 of the tubular member 214 does not carry the debris or soil kicked up from the ground 102 into the bearing groove 224. Thus, the seal 228 ensures a long service life of the bearing groove 224.

In the embodiment described above, the bearing groove 224 is made of ultra high molecular weight polyethylene compound or steel. The ultra high molecular weight polyethylene compound of the bearing is self lubricating. Hence, the bearing groove 224 made from ultra high molecular weight polyethylene compound may not entail frequent cleaning due to the absence of dirt prone substances such as grease or lubricants. Further, the ultra high molecular weight polyethylene compound is resistant to wear and impact which allows the bearing groove 224 to sustain service life for a longer period of time due to a reduced frictional contact with the portion 222 of the second end 218. Furthermore, the ultra high molecular weight polyethylene compound is water resistant whereby corrosion is prevented in the bearing groove 224.

In the embodiment as shown in FIG. 5, the flexible cover 210 further includes one or more longitudinal seams 502 running from the first end 216 of the tubular member 214 to the second end 218 of the tubular member 214. The longitudinal seams 502 allow a sheet of elastomeric material to be formed into the tubular member 214 during manufacturing. Alternatively, the tubular member 214 may be manufactured as a unitary monolithic product by processes such as extrusion, drawing, injection molding or other processes ordinarily known to one skilled in the art.

In the embodiment described above, the flexible cover 210 may further include annular support rings 504 rigidly attached to an inner wall 506 of the tubular member 214. The annular support rings 504 are intermittently spaced along a length L of the tubular member 214. The annular support rings 504 provide support to the tubular member 214 while maintaining a controlled degree of flexibility in the tubular member 214 during relative movement between the axle 206 and the wheel hub 208 with respect to the chassis 225. The support to the tubular member 214 provided by the annular support rings 504 further ensures a prolonged service life of the tubular member 214.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

We claim:

1. A flexible cover for an axle hub joint comprising:
    a tubular member configured to cover the axle hub joint and having a first end and a second end;
    a first flange defined at the first end of the tubular member, the first flange is rigidly attached to a wheel hub;
    a portion of the second end of the tubular member configured to rotatably connect to a bearing groove and is free to rotate within the bearing groove; and
    a seal abutting the portion of the second end, wherein the seal defines a leak proof flexible cover for the axle hub joint.

2. The flexible cover of claim 1 further including a second flange rigidly attached to the portion of the second end of the tubular member.

3. The flexible cover of claim 2, wherein the bearing groove is configured to substantially concentrically receive one of the portion of the second end and the second flange.

4. The flexible cover of claim 1 further including one or more longitudinal seams running from a first end of the tubular member to the second end of the tubular member.

5. The flexible cover of claim 1 further including one or more annular support rings rigidly attached to an inner wall of the tubular member, wherein the annular support rings are intermittently spaced along a length of the tubular member.

6. An axle hub assembly for a machine comprising:
    an axle;
    a wheel hub rotatably connected to the axle by an axle hub joint; and
    a flexible cover including:
        a tubular member configured to cover the axle hub joint and having a first end and a second end;
        a first flange defined at a first end of the tubular member is rigidly attached to the wheel hub;
        a portion of the second end of the tubular member configured to rotatably connect to a bearing groove and is free to rotate within the bearing groove; and
        a seal abutting the portion of the second end, wherein the seal defines a leak proof flexible cover for the axle hub joint.

7. The axle hub assembly of claim 6 further including a second flange rigidly attached to the portion of the second end of the tubular member.

8. The axle hub assembly of claim 7, wherein the bearing groove is configured to substantially concentrically receive one of the portion of the second end and the second flange.

9. The axle hub assembly of claim 6, wherein walls of the bearing groove are made from one of ultra high molecular weight polyethylene compound or steel.

10. The axle hub assembly of claim 6 further including one or more longitudinal seams running from a first end of the tubular member to the second end of the tubular member.

11. The axle hub assembly of claim 6 further including one or more annular support rings rigidly attached to an inner wall of the tubular member, wherein the annular support rings are intermittently spaced along a length of the tubular member.

12. A machine comprising:
    an engine;
    a differential rotatably connected to the engine;
    an axle hub assembly encasing the differential; the axle hub assembly including:
    an axle;
    a wheel hub rotatably connected to the axle by an axle hub joint; and
    a flexible cover including:
        a tubular member configured to cover the axle hub joint and having a first end and a second end;
        a first flange defined at a first end of the tubular member is rigidly attached to the wheel hub;
        a portion of the second end of the tubular member configured to rotatably connect to a bearing groove and is free to rotate within the bearing groove; and
        a seal abutting the portion of the second end, wherein the seal defines a leak proof flexible cover for the axle hub joint.

13. The machine of claim 12 further including a second flange rigidly attached to the portion of the second end of the tubular member.

14. The machine of claim 13, wherein the bearing groove is configured to substantially concentrically receive one of the portion of the second end and the second flange.

15. The machine of claim 12, wherein walls of the bearing groove are made from one of ultra high molecular weight polyethylene compound or steel.

16. The machine of claim 12 further including one or more longitudinal seams running from a first end of the tubular member to the second end of the tubular member.

17. The machine of claim 12 further including one or more annular support rings rigidly attached to an inner wall of the tubular member, wherein the annular support rings are intermittently spaced along a length of the tubular member.

* * * * *